US006934607B2

(12) United States Patent
Blaine

(10) Patent No.: US 6,934,607 B2
(45) Date of Patent: Aug. 23, 2005

(54) METHOD AND APPARATUS FOR VISUALLY INDEXING OBJECTS UPON A MOVING SURFACE

(75) Inventor: George Blaine, Lake Stevens, WA (US)

(73) Assignee: FMC Technologies, Inc., Chicago, IL (US)

( * ) Notice: Subject to any disclaimer, the term of this patent is extended or adjusted under 35 U.S.C. 154(b) by 113 days.

(21) Appl. No.: 10/395,365

(22) Filed: Mar. 21, 2003

(65) Prior Publication Data

US 2004/0186618 A1 Sep. 23, 2004

(51) Int. Cl.[7] .......................... G05B 13/00; G03B 21/00

(52) U.S. Cl. ......................... 700/275; 700/58; 700/230; 353/28; 353/69

(58) Field of Search ............................ 700/56–64, 112, 700/114, 124, 125, 166, 192, 228–230, 275; 198/340, 340.01–340.05, 866; 353/28, 29, 48, 49, 69, 70

(56) References Cited

U.S. PATENT DOCUMENTS 4,176,566 A * 12/1979 Patterson et al. .............. 83/29
4,514,899 A * 5/1985 Burger ........................ 29/721
4,941,100 A 7/1990 McFarlane et al.
4,941,183 A 7/1990 Bruder et al.
5,430,662 A * 7/1995 Ahonen ......................... 703/1
5,625,489 A * 4/1997 Glenn ........................ 359/455
5,646,859 A 7/1997 Petta et al.
5,838,569 A 11/1998 Gane
6,170,163 B1 1/2001 Bordignon et al.
6,245,369 B1 6/2001 Kobussen et al.
6,298,275 B1 10/2001 Herman, Jr.
6,317,980 B2 11/2001 Buck, III
6,428,169 B1 * 8/2002 Deter et al. ................... 353/20
6,431,711 B1 * 8/2002 Pinhanez ..................... 353/69
6,439,370 B1 8/2002 Hoffman, Jr. et al.
6,472,676 B1 10/2002 Douglas et al.
6,487,460 B1 * 11/2002 Haeno ......................... 700/58
6,580,962 B2 6/2003 Rapoza et al.
6,731,991 B1 * 5/2004 Michalski et al. ............ 700/59

FOREIGN PATENT DOCUMENTS

EP 1 157 793 A1 11/2001

* cited by examiner

*Primary Examiner*—Paul Rodriguez
(74) *Attorney, Agent, or Firm*—Christensen O'Connor Johnson Kindness PLLC

(57) ABSTRACT

A visual indexing system (10) for assisting placement of an object (36) in a selected location upon a surface (16) moving in a selected direction at a selected speed relative to a stationary frame is provided. The indexing system includes a visual image generator (12) operable to project a visual image (18) upon the moving surface such that the visual image is reproduced upon the moving surface. The indexing system also includes a controller (14) adapted to control the location at which the visual image generator projects the reproduced visual image (18) upon the moving surface. The controller controls the location of the reproduced visual image such that the reproduced visual image moves in substantially the same selected direction and speed as the moving surface, thereby resulting in substantially no relative movement between the reproduced visual image and the moving surface.

59 Claims, 3 Drawing Sheets

METHOD AND APPARATUS FOR VISUALLY INDEXING OBJECTS UPON A MOVING SURFACE

FIELD OF THE INVENTION

The present invention relates generally to methods and apparatuses for indexing objects upon a moving surface, and more particularly, to methods and apparatuses for visually indexing objects upon a moving surface by projecting a visual image upon the moving surface.

BACKGROUND OF THE INVENTION

In manufacturing, a moving surface, such as a conveyor belt, is often used to transport an object from one place to another. Often, the location of the object or objects upon the moving surface is critical. This is especially true when the moving surface is serving as a product infeed device for providing objects, such as raw materials, to a machine for processing. For instance, the moving surface may be acting as an infeed conveyor belt for a portioning machine, wherein objects or workpieces, such as chicken breasts, placed upon the conveyor belt are further processed, for example, trimmed or portioned. For efficient trimming or portioning, it is important to place the workpieces onto the belt in a particular manner with correct spacing between workpieces. If the workpieces are placed on the conveyor belt too close to each other, it may not be possible for a portioner to accurately cut the workpieces. If the workpieces are placed too far apart, then the full capacity of the portioning machine is not utilized. Further, it is often desirable to place the workpiece in a particular orientation on the belt for more efficient portioning. Further still, the selected placement parameters, such as spacing, orientation, etc., may change at any time.

In one previously developed system, a static laser is used to form a straight line down the belt along which the workpieces to be portioned are to be placed. The worker is instructed to place the workpieces at a certain distance from each other along the line. However, significant errors in placement often occur, since it may be difficult for the workers to position the workpieces at a uniform spacing along the line. Also, often workers experience difficulty in aligning the workpieces laterally along the belt with sufficient precision so that the side-to-side location of the workpieces on the belt is accurate. This can also reduce the efficiency of the portioning machine. Further, the line does not provide the worker with orientation information. In other words, the line does not indicate to the worker how the product should be oriented when placed upon the belt.

In another previously developed system, a grid is permanently printed upon the conveyor belt, thereby providing some guidance as to where the workpieces to be portioned should be placed. For instance, a worker may be instructed to place the workpieces at an intersection of certain grid lines, or within a selected square of the grid. However, significant errors in placement often occur, since it may be difficult for the workers to accurately center the workpieces upon an intersection of grid lines, or within a particular square of the grid.

Like the above described previously developed system, the inaccurate placement of the workpieces upon the conveyor belt reduces the efficiency of the portioning machine. Further, the grid does not provide the worker with orientation information. In other words, the line does not indicate to the worker how the product should be oriented when placed upon the belt, only where. Further, since the grid is permanently printed upon the conveyor belt, the grid is static in nature and can not be dynamically adjusted to accommodate different shaped workpieces or changes in placement parameters.

Thus, there exists a need for a method and apparatus for indexing objects upon a moving surface that indicates to a worker the correct spacing and/or orientation of an object to be placed upon a moving surface that is economical to manufacture, has a high degree of reliability, and satisfies the performance expectations of the end user.

SUMMARY OF THE INVENTION

One embodiment of a visual indexing system formed in accordance with the present invention for assisting placement of an object in a selected location upon a surface moving in a selected direction at a selected speed relative to a stationary reference is provided. The indexing system includes a visual image generator operable to project a visual image upon the moving surface such that the visual image is reproduced upon the moving surface. The indexing system also includes a controller operably connected to visual image generator, the controller capable of controlling the location at which the visual image generator projects the reproduced visual image upon the moving surface. The controller controls the location of the reproduced visual image such that the reproduced visual image moves in substantially the same selected direction and speed as the moving surface, thereby resulting in substantially no relative movement between the reproduced visual image and the moving surface.

In another embodiment formed in accordance with the present invention, an infeed system for a workpiece processor is provided. The workpiece processor includes a conveyor for delivery of workpieces to the processor, the conveyor including a conveyor belt supported by a frame. The workpiece processor further includes a visual image generator operable to project a first visual image upon the conveyor belt such that the first visual image is reproduced upon the moving surface. The workpiece processor also includes a control system for controlling the location at which the visual image generator projects the first visual image on the conveyor belt, whereby the first visual image moves at substantially the same speed as the conveyor belt.

In an alternative embodiment of the present invention, a method of indexing placement of an object upon a surface moving relative to a stationary reference is provided. The moving surface is conveyed in a selected direction at a selected speed relative to the stationary reference. The method includes projecting visual images about corresponding trajectory axes from a visual image generator such that the visual images are reproduced upon the moving surface. The method further includes controlling the movement of the trajectory axes of the visual image generator relative to the stationary reference such that the visual images reproduced upon the moving surface move in substantially the same selected direction and at substantially the same selected speed as the moving surface. Thus, there is substantially no perceived relative movement between the reproduced visual images and the moving surface.

BRIEF DESCRIPTION OF THE DRAWINGS

The foregoing aspects and many of the attendant advantages of this invention will become better understood by reference to the following detailed description, when taken in conjunction with the accompanying drawings, wherein.

DETAILED DESCRIPTION OF THE PREFERRED EMBODIMENT

Figure 1:
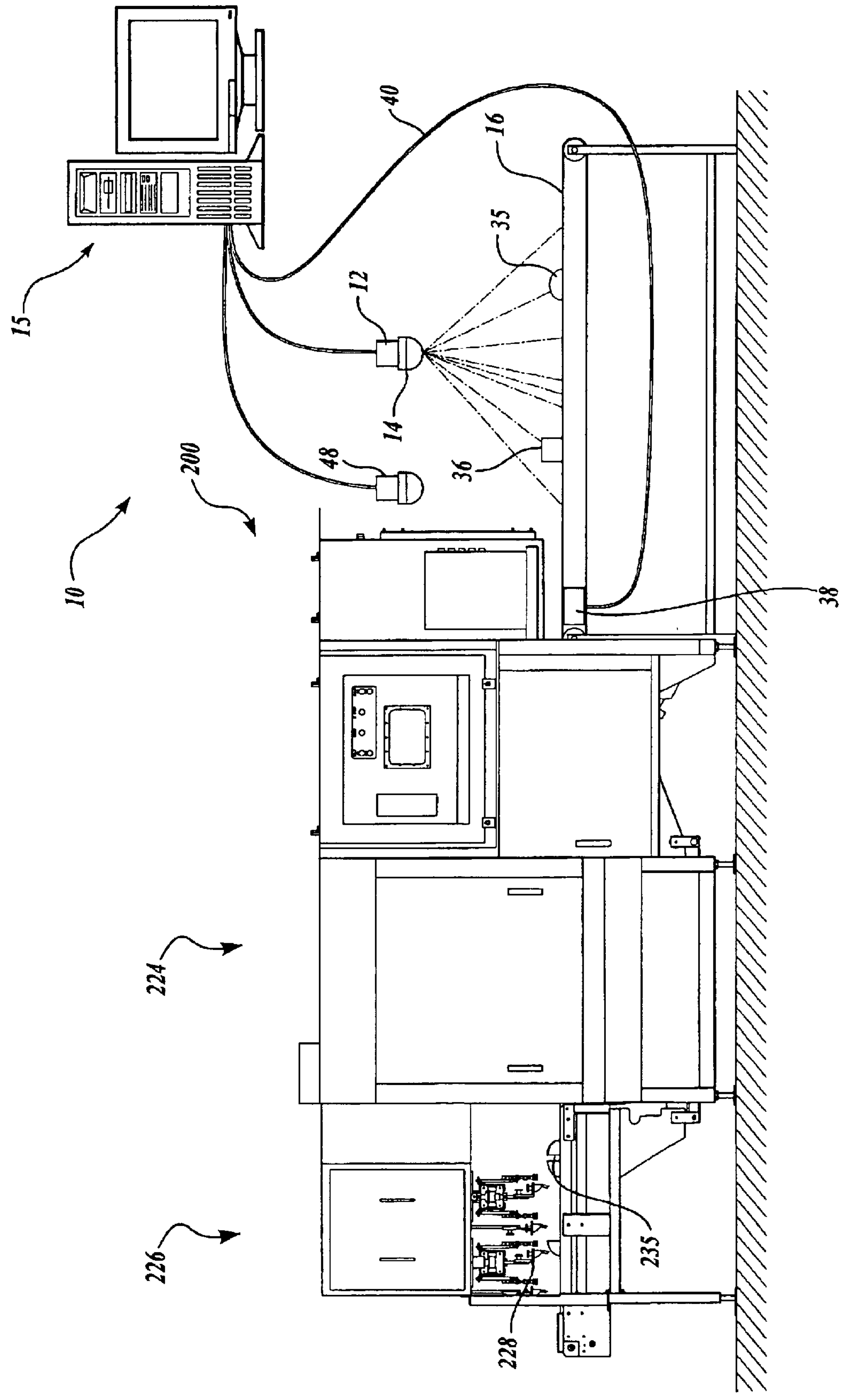
FIG. 1 is an elevation view of a visual indexing system formed in accordance with one embodiment of the present invention, the visual indexing system shown in conjunction with a portioning apparatus.
Figure 2:
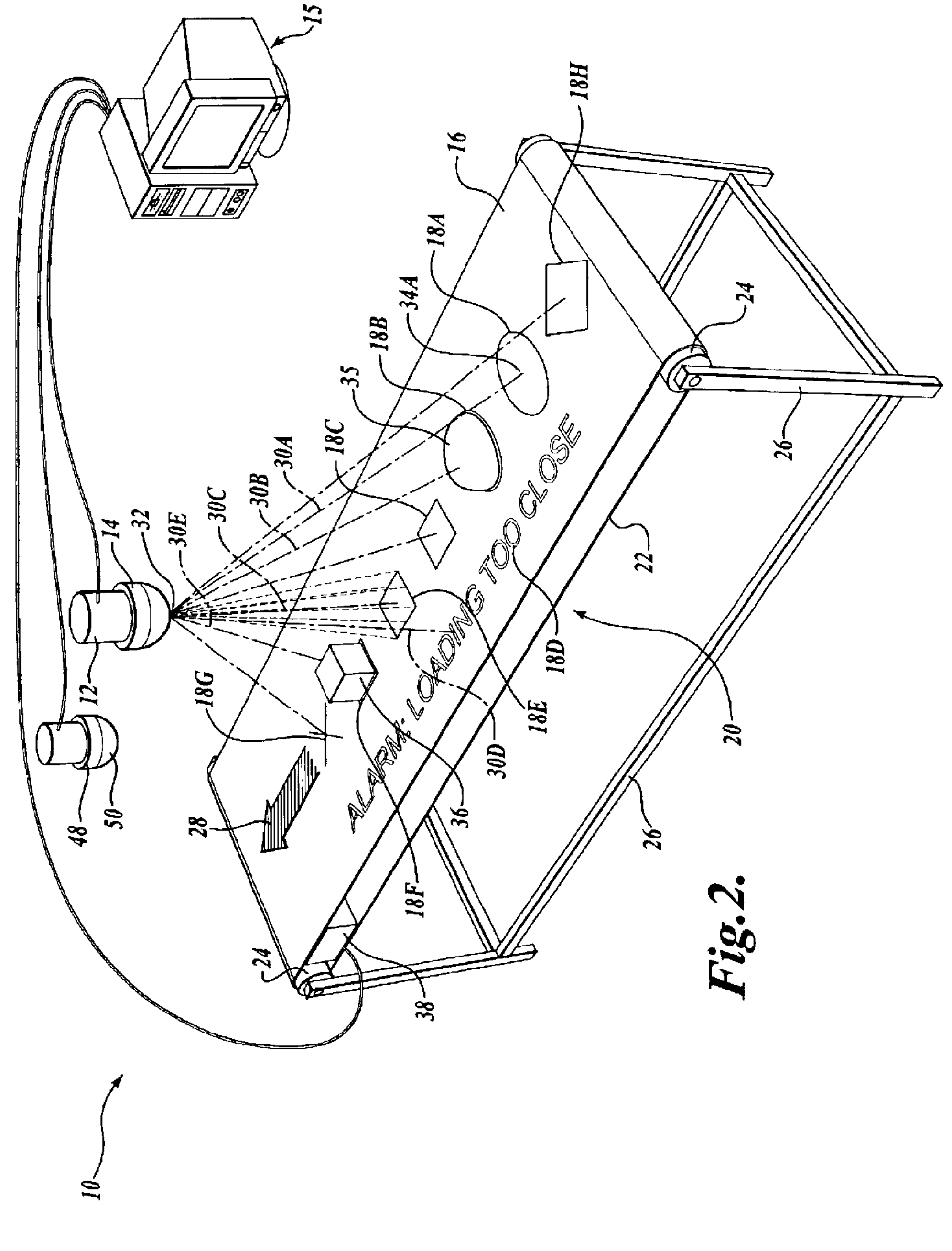
FIG. 2 is a perspective view of the visual indexing system depicted in FIG. 1, the visual indexing system shown projecting visual images upon a moving surface to assist a worker in correctly indexing objects placed upon the moving surface.

FIGS. 1 and 2 illustrate a visual indexing system 10 formed in accordance with one embodiment of the present invention. Generally described, the visual indexing system 10 includes a visual image generator 12, a controller 14, and a data processor 15. The visual image generator 12 is adapted to project a visual image upon a moving surface 16, while the controller 14 is adapted to selectively control the location of the reproduced visual image 18 upon the moving surface 16. The reproduced visual image 18 may provide a means of visually indexing the placement of workpieces 35 and 36 upon the moving surface 16. The data processor 15 in the illustrated embodiment is depicted as a computer, however it should be apparent to those skilled in the art that the data processor 15 may take many forms. The data processor 15 may control the operation of the controller 14, moving surface 16, and/or a portion apparatus 200, as will be described in more detail below. The data processor 15, in combination with the controller 14, may be collectively referred to as a control system.

The visual indexing system 10 may operate as an infeed visual indexing system 10 for a processing machine, such as the portioning apparatus 200 of FIG. 1. The portioning apparatus 200 includes a portioning station 224 and an unloading station 226 wherein a plurality of pickup devices 228 pick up the portioned pieces 235 off the moving surface 16 at the unloading station 226 and place the portioned pieces 235 onto removal or take-away conveyors (not shown) moving outwardly alongside the moving surface 16.

The portioning apparatus 200 processes the workpieces 35 and 36 placed upon the moving surface 16 of the visual indexing system 10 by trimming or portioning the workpieces 35 and 36. For the portioning apparatus 200 to efficiently trim or portion the workpieces 35 and 36, it is desirable that the workpieces 35 and 36 are placed on the moving surface 16 in a uniform manner with correct spacing between workpieces 35 and 36. If the workpieces are placed on the moving surface 16 too close to each other, it may not be possible for the portioning apparatus 200 to accurately cut the workpieces 35 and 36. If the workpieces 35 and 36 are placed too far apart, then the full capacity of the portioning apparatus 200 is not utilized. Further, it is often desirable to place the workpieces 35 and 36 in a particular orientation on the belt for more efficient portioning, for example, having the length of the workpieces 35 and 36 oriented laterally across the moving surface 16.

The illustrated embodiment of the visual indexing system 10 is adapted to project a series of visual images upon the moving surface 16 to provide a visual indication to a worker of the correct location and/or orientation to place workpieces 35 and 36 upon the moving surface 16. Further, it may be desirable to evaluate the accuracy of the worker's placement of the workpieces 35 and 36 upon the moving surface 16 and/or evaluate the deviation of the shape and/or size of the workpiece relative to a nominal shape and/or size of the workpiece. The visual indexing system 10 of the illustrated embodiment of the present invention includes an optical sensor 48 for evaluating whether the workpiece has been placed in the correct location and/or orientation relative to the visual images reproduced on the moving surface 16, and further, is adapted to evaluate any deviations between the shape and/or size of the workpieces 35 and 36 relative to the nominal shape and/or size of the workpieces 35 and 36.

In the illustrated embodiment, the optical sensor 48 is depicted above the moving surface 16 in a location exterior of the portioning station 224. However, it should be apparent to those skilled in the art, that the optical sensor 48 may be placed in alternate locations, such as within the portioning station 224.

Referring specifically to FIG. 2 and returning to discussion of the visual indexing system 10, the moving surface 16 may be part of a conveyor system 20. In the conveyor system 20, the moving surface may be in the form of an endless belt 22 extending between and partially around a pair of spaced apart rollers 24. The rollers 24 are mounted on a stationary frame 26. At least one of the rollers 24 is selectively driven by a standard drive system (not shown) such that the upper surface, or moving surface 16, of the endless belt 22 is endlessly driven in a selected direction and at a selected speed, both represented by the vector indicated by reference numeral 28. The drive system may be adjustable, such that the moving surface 16 may be driven at a variety of speeds, and may accelerate or decelerate to meet the needs of the user.

In one embodiment of the present invention, the endless belt 22 has an outer surface that is white in color, however, it should be apparent to those skilled in the art that other colors are suitable for use with the present invention. Although the moving surface 16 of the illustrated embodiment of the present invention is depicted as part of a conveyor system 20 that utilizes an endless belt 22 as the moving surface 16, it should be apparent to those skilled in the art that other moving surfaces are suitable for use with the present invention, such as conveyor systems using rollers, linearly actuated panels, etc.

Suspended above the moving surface 16 are the visual image generator 12 and the controller 14. The visual image generator 12 is operable to produce visual images and project the visual images about a trajectory axis 30 such that the visual image is reproduced upon the moving surface 16. In the illustrated embodiment, the visual image generator 12 may include a laser based light source, the laser able to produce a high intensity narrow beam of light for projecting a visual image upon the moving surface 16. In another embodiment, the visual image generator 12 may use a Liquid Crystal Display (LCD) projection unit to project a visual image outward toward the moving surface 16.

In a further embodiment, the visual image may be comprised of a light source selectively blocked in areas and selectively uncovered in areas, permitting light to selectively pass from a light source. For instance, such a visual image generator may be created by placing a light source behind a template, the template having a specific pattern cut therein. The light passes through the pattern cut in the template, thereby reproducing the visual image of the pattern upon the moving surface 16. Although several examples of visual image generators 12 are described above, it should be apparent to those skilled in the art that other visual image generators are suitable for use with the present invention and that the scope of the present invention extends beyond the examples detailed herein to include other visual image generators 12 here now known or to be developed in the future.

Coupled to the visual image generator 12 is the controller 14. The controller 14 selectively controls the location of the reproduced visual image 18 upon the moving surface 16 based upon instructions received from the data processor 15. In the illustrated embodiment, the visual image generator 12 is stationary, and the location of the reproduced visual image 18 is manipulated by the controller 14 such that the reproduced visual image 18 moves relative to the stationary frame 26. Preferably, the location of the reproduced visual image 18 upon the moving surface 16 is manipulated such that the reproduced visual image 18 moves in substantially the same direction and at substantially the same speed as the moving surface 16, represented by vector 28. Thus, there is substantially no perceived movement of the reproduced visual image 18 relative to the moving surface 16.

The controller 14, at the direction of the data processor, accomplishes the movement of the reproduced visual image 18 by selectively adjusting the angle about which the visual image is projected outward from the visual image generator 12, or in other words, by adjusting an orientation of a trajectory axis 30 of the visual image. For use in this detailed description, the trajectory axis 30 is the axis about which the visual image is projected, and is defined as a line intersecting the visual image emission point 32 of the visual image generator 12 or controller 14, or alternately the center of the projected visual image, and the center point 34 of the reproduced visual image 18 upon the moving surface 16. In the illustrated embodiment, the controller 14 may be a well known laser beam control system, some suitable examples being rotating mirror or galvanometer-based laser beam control systems, or other such well known laser beam control systems. The controller 14 is used to selectively control the orientation of the trajectory axis 30 and thereby, the location of the visual image 18 upon the moving surface 16.

In an alternate embodiment, the angle of the trajectory axis remains constant and the controller 14 moves the visual image generator 12 to cause a corresponding movement of the reproduced visual image 18 upon the moving surface 16. More specifically, the controller 14 operates to selectively move the location of the visual image generator 12 instead of the angle of the trajectory axis 30. In this embodiment, visual image generator 12 and controller 14 are dynamically mounted above the moving surface 16, such that the visual image generator 12 can move laterally and longitudinally above the moving surface 16. The visual image generator 12 projects a visual image along a trajectory axis 30 that remains at a selected angular orientation relative to the moving surface, such as directly downward so as to be at a perpendicular orientation relative the moving surface 16. The controller 14 is then operable to move the visual image generator 12 in an X-Y coordinate system above the moving surface. Due to the movement of the visual image generator 12, the images reproduced 18 upon the moving surface will move relative to the stationary frame 26 in the same manner as the controller 14 moves the visual image generator 12.

In the illustrated embodiment, the reproduced visual images 18 are formed by light emitted from the visual image generator 12 reflecting off of the moving surface 16. The reproduced visual images 18 may take many forms. For example, in the illustrated embodiment, the reproduced visual image 18 is shown in the form of a X-shaped visual image 18G, the X-shaped visual image 18G marking the location of a desired placement of an object. Also in the illustrated embodiment, the reproduced visual image 18 is shown in the form of an outline, or a portion of an outline, of an object to be placed upon the moving surface 16. For instance, reproduced visual images 18G. 18E, and 18F represent the outline of a box, the outline reproduced in the desired location and orientation at which the workpiece 36, which is a box, should be placed upon the moving surface 16. The location and shape of the reproduced visual images 18 is determined by the data processor 15, which then sends command signals to the controller 14 instructing the controller 14 to project the desired image in the desired location upon the moving surface 16.

Further, the reproduced visual image 18 may take the form of text 18D. The text 18D may indicate instructions to be followed by a worker in the vicinity of the moving surface 16, or an alarm condition, such as the objects are being loaded too close to one another, too far from one another, that the moving surface is about to move or stop, or other such instructions or information. Although specific reproduced visual images 18 are described and illustrated, it should be apparent to those skilled in the art that the reproduced visual images 18 may take many forms, such as geometric shapes, a suitable example being a rectangle, plus signs, an L-shaped visual image, or other such images that help to align the workpieces upon the moving surface 16.

In the illustrated embodiment, the visual image generator 12 is operable to simultaneously project multiple visual images down upon the moving surface 16. For instance, in the illustrated embodiment, the visual image generator 12, with the assistance of the controller 14, is adapted to simultaneously project all of the visual images 18 depicted in FIG. 2 simultaneously upon the moving surface 16. Further, the visual image generator 12, with the assistance of the controller 14, is further operable to simultaneously adjust the trajectory axis 30 of each reproduced visual image 18 such that the reproduced visual images 18 travel in substantially the same direction and at substantially the same speed as the moving surface 16 as described above. Thus, the visual images 18 may be used as a means for indexing the placement of objects upon the moving surface 16. More specifically, a worker can visually determine the correct placement of an object, such as a workpiece 36 in the form of a box, upon the moving surface 16 by observing a reproduced visual image 18 upon the moving surface 16, and placing the workpiece 36 in a selected relationship/orientation relative to the reproduced visual image 18 upon the moving surface 16.

In one exemplary use of the above described embodiment of the present invention, a series of reproduced visual images 18, such as reproduced visual images 18G. 18E, and 18F, are projected upon the moving surface 16 simultaneously to produce a longitudinally aligned series of similar reproduced visual images, each spaced uniformly from one another. The reproduced visual image 18C, 18E, and 18F are simultaneously moved by the controller 14 at the direction of the data processor upon the moving surface 16 in substantially the same direction and at substantially the same speed as the moving surface 16, such that there is substantially no perceived relative movement between the reproduced visual images 18C, 18E, and 18F and the moving surface 16. A worker then places an object, such as workpiece 36, within the reproduced visual image 18F. The process is repeated by the worker, such that all reproduced visual images 18C, 18E, and 18F are occupied with an object, each object correctly spaced and aligned from one another for later processing.

As described above, the reproduced visual images 18 are each spaced from one another by a selected separation distance. In the illustrated embodiment, the separation distance is selectable and adjustable on the "fly." More specifically, the data processor 15 may direct the controller 14 to selectively adjust the separation distance between adjacent reproduced visual images 18, such that the rate at which the workpieces 35 and 36 are delivered by the visual indexing system 10 is manipulated. For instance, with the selected speed of the moving surface 16 remaining constant, by decreasing the separation distance between reproduced visual images 18 by one half, workpieces 35 and 36 placed within the reproduced visual images 18 will be delivered at twice the previous rate. The separation distance can be adjusted on the "fly," such that, for example, during start-up, the separation distance may be increased to allow workers more time to place the workpieces 35 and 36 upon the reproduced visual images 18. As the workers become more efficient, the separation distance may be decreased to increase the delivery rate of the workpieces 35 and 36. Or the separation distance may be selected to match the efficiency of each individual worker such that the visual indexing system 10 can accommodate a change in worker efficiency or speed, for example, after a shift change.

Further, although the separation distance is described as generally constant for a series of reproduced visual images, it should be apparent to those skilled in the art that the separation distance may be variable and adjustable. Moreover, a separation distance between a first and a second reproduced visual image may vary from that between the second reproduced visual image and a third reproduced visual image. Further still, the orientation of the reproduced visual image may change. For example, the orientation of reproduced visual image 18F may be adjusted to an alternate orientation, such as to the orientation depicted for reproduced visual image 18H.

Although the reproduced visual images 18 are described as moving in substantially the same direction and at substantially the same speed as the moving surface 16, it should be apparent to one skilled in the art that they may move at other speeds and directions relative to the frame 26 or other reference point, or remain stationary relative to the frame 26. For instance, the reproduced visual image 18D comprising text may remain stationary relative to the frame 26, such that the visual image 18D remains in the vicinity of a worker stationed near the moving surface 16. Further, it should be noted that the reproduced visual images 18 may each individually move at different directions and speeds. For instance, the textual visual image 18D may remain stationary relative to the frame 26, while the remaining reproduced visual images 18 move in the direction and speed of vector 28.

Still referring to FIGS. 1 and 2, the data processor 15 is adapted to receive a signal indicative of the speed of the moving surface 16. A sensor 38 is associated with the conveyor system 20, the sensor 38 operable to sense the speed of the moving surface 16. The sensor 38 is operable to send a signal indicative of the sensed speed along a signal wire 40 or other communication device, such as a wireless communication device, to the data processor 15. The data processor 15 processes the signal received, and instructs the controller 14 to adjust the rate of trajectory axis 30 movement such that the reproduced visual images 18 move in substantially the same speed as the moving surface 16.

In the illustrated embodiment, the direction of travel of the moving surface 16 is known and constant, therefore this information does not necessarily need to be relayed to the data processor 15. However, if the moving surface 16 were able to alter direction of travel, then the sensor 38 may be adapted to sense the selected direction and transmit a signal indicative of the direction of travel for processing by the data processor 15. The data processor 15 then instructs the controller 14 such that the reproduced visual images 18 are projected upon the moving surface 16 so as to have substantially no relative movement between the reproduced visual images 18 and the moving surface 16.

Still referring to FIGS. 1 and 2, the visual indexing system 10 also includes a well known optical sensor 48. The optical sensor 48 may be suspended above/the moving surface 16 such that a well known sensing element 50 of the optical sensor 48 is directed down upon the moving surface 16 and any object carried thereupon. The optical sensor 48 is adapted to view a workpiece, such as workpiece 36 and a reproduced visual image, such as reproduced visual image 18F, to determine any discrepancy between the workpiece 36 and an ideal workpiece indicated by reproduced visual image 18F reproduced upon the moving surface 16.

More specifically, the optical sensor 48 may view the workpiece 36 and the reproduced visual image 18F to determine any deviation of the shape, size, orientation, location, etc. of the workpiece from an ideal shape, size, orientation, location, etc. of the workpiece. For instance, the optical sensor 48 may view a workpiece 36 placed upon the moving surface 16 relative to the reproduced visual image 18F of which the workpiece 36 has been placed within. The optical sensor 48 then sends the sensed image of the reproduced visual image 18F and of the workpiece 36 to the data processor 15. The data processor 15 is operable to compare the two sensed images to determine if the object is within tolerances for size, shape, orientation, and location relative to the reproduced visual image 18F. The data processor 15 may then communicate this information to the portioning apparatus 200 to aid the portioning apparatus in determining the best method of portioning the workpiece 36 based on the sensed images.

The data processor 15 may also use this information to set the conveyor speed and product spacing to optimize the process. Moreover, the speed of the moving surface 16 and spacing between workpieces is adjusted based on how accurately the worker can load the workpieces, as well as the nature of the workpiece and processes to which the workpiece will undergo after loading. More specifically, the data processor 15 may be coupled to the speed controller 38 for the conveyor system 20, such that the endless belt 22 may be sped up or slowed down relative to the information received. For instance, if out of tolerance deviations are detected between the location of the workpiece 36 and the reproduced visual image 18F, the speed of the endless belt 22 may be slowed to allow a worker more time to place the workpiece 36 correctly within the reproduced visual image 18F. Further, the data can be stored as an evaluation tool for evaluating worker performance.

In the illustrated embodiment, the visual indexing system is described as comparing the actual workpiece 36 with the reproduced visual image 18 of an ideally shaped, sized, oriented, and located workpiece. However, it should be apparent to those skilled in the art that alternately, the optical sensor 48 may view the workpiece 36 and compare the image of the workpiece 36 with an ideal shape, size, orientation, and location of the workpiece as stored, generated or determined by the data processor 15, and not the visual reproduced image as described above. The data processor 15 determines by the comparison any deviation of the shape, size, orientation, location, etc. of the workpiece from the ideal shape, size, orientation, location, etc. of the workpiece.

Figure 3:
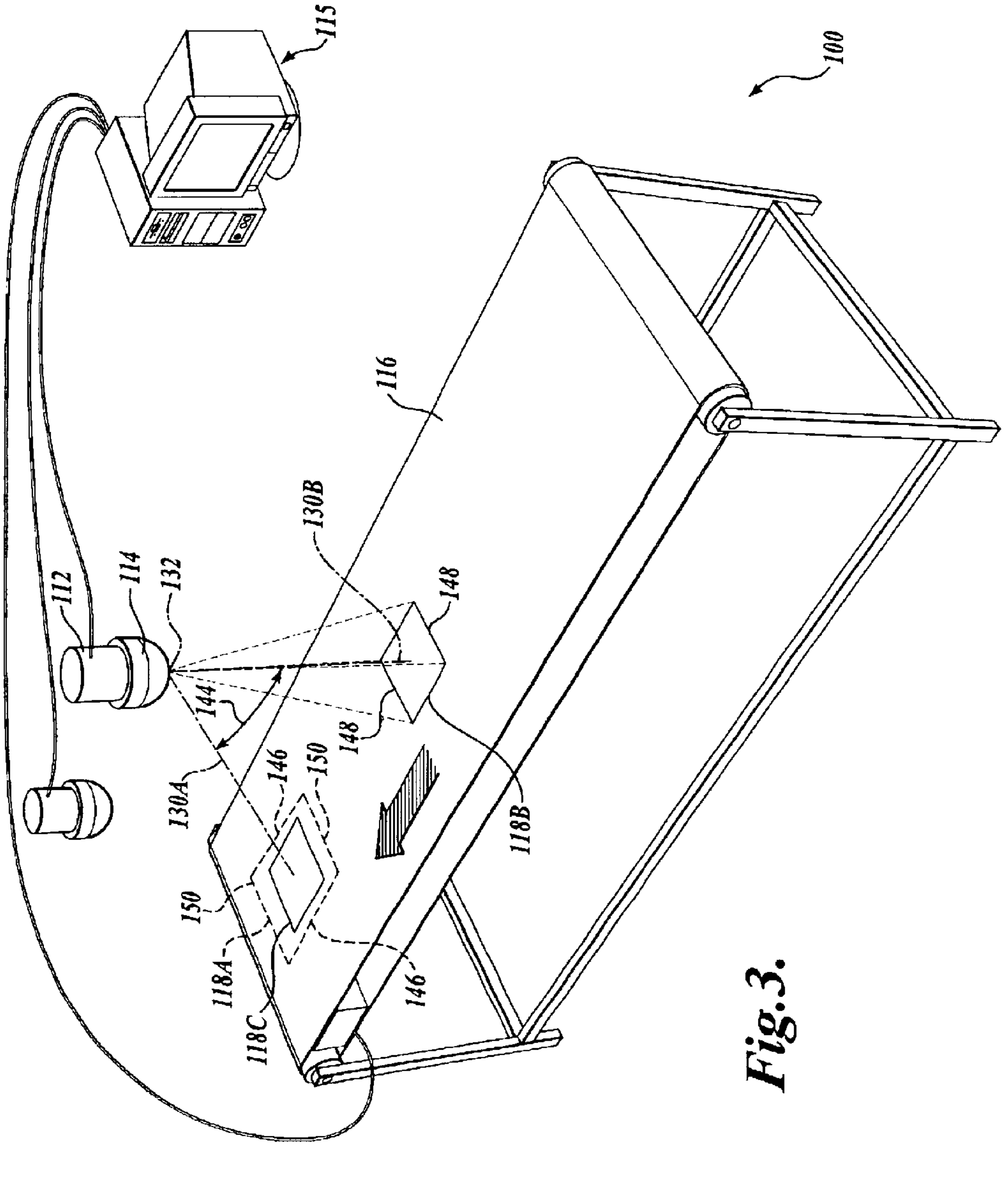
FIG. 3 is a perspective view of an alternate embodiment of a visual indexing system formed in accordance with the present invention, the visual indexing system operable to correct errors in the visual images reproduced upon the moving surface due to the presence of an oblique angle between the upper surface of the moving surface and an axis about which the visual image is projected.

Referring to FIG. 3, an alternate embodiment of a visual indexing system 100 formed in accordance with one embodiment of the present invention is depicted. The alternate embodiment of the visual indexing system 100 is substantially similar to the visual indexing system 10 depicted in FIG. 1, with exception that the data processor 15 has been modified. Therefore, for the sake of brevity, the following discussion of the alternate embodiment depicted in FIG. 3 will focus only upon the areas in which the alternate embodiment deviates from the visual indexing system 10 depicted in FIG. 1, which as stated above, lies in modifications to the data processor 15.

The modified data processor 115 of the alternate embodiment is operable to correct errors caused by the presence of an offset angle 144 present between the trajectory axis 130A and an imaginary line (which happens to be collinear with the trajectory axis 130B of reproduced visual image 118B at the moment of time depicted in FIG. 3) extending perpendicularly upward from the moving surface 116 and intersecting the emission point 132 of the controller 114. More specifically, when a visual image generator 112 projects a visual image directly downward upon the moving surface 116 about a trajectory axis 130B that is perpendicularly oriented relative to the moving surface 116, the reproduced visual image 118B appears undistorted and correctly proportioned upon the moving surface 116. However, as the trajectory axis is offset from the ideal perpendicular orientation relative to the moving surface 116, the reproduced visual image 118A (shown in phantom) becomes distorted, such that the reproduced visual image 118A is disproportionate or elongated relative to the ideal shaped reproduced visual image 118B formed when the trajectory axis 130B is perpendicularly oriented relative to the moving surface 116. The error in the reproduced visual image 118A increases relative to an increase in magnitude of the offset angle 144.

The data processor 115 of the present invention is operable to instruct the controller 114 to correct the error caused by the offset angle 144, such that the reproduced visual image remains substantially constant in shape regardless of the offset angle 144 present between the trajectory axis 130A and the imaginary line 130B oriented perpendicular with the moving surface 16. For instance, reproduced visual image 118C depicts the desired shape of the visual reproduced visual image, while reproduced visual image 118A depicts a non-corrected reproduced visual image, wherein reproduced visual image 118A is distorted due to the presence of the offset angle 144. Reproduced visual image 118C has been corrected such that the distortion normally caused by the offset angle 144 has been reduced, to thereby produce a substantially correctly proportioned reproduced visual image 118C despite the presence of the offset angle 144.

For example, reproduced visual image 118B of the illustrated embodiment is a 6 inch square when present directly beneath the controller 114. However, as the reproduced visual image 118 is moved away from location of reproduced visual image 118B towards the location of reproduced visual image 118C such that the offset angle 144 is increased to 45 degrees, then the longitudinal sides 146 of the non-corrected reproduced visual image 118A become elongated, such that the sides will be 8.5 inches (length/cos(b)) in the non-corrected image 118A. The data processor 115 is adapted to correct the visual image such that the corrected reproduced visual image 118C is shown correctly proportioned, i.e. having 6 inch sides, despite an increase in the offset angle 144.

As should be apparent to one skilled in the art, although the calculations shown for correcting the longitudinal elongation of the reproduced visual image are described, it should also be apparent to those skilled in the art that an increase in the offset angle 144 also causes a slight widening of the non-corrected reproduced visual image 118A. For instance, for the controller 114 to trace the top and bottom edges 148 of the 6 inch box of the reproduced visual image 118B, the laser beam of the visual image generator 112 may only need to undergo an angular displacement of three degrees to scribe the top and bottom edges 148. However, when the offset angle 144 is increased such that the reproduced visual image is in the location of the uncorrected reproduced visual image 118A, if the laser beam were to undergo an angular displacement of three degrees to scribe the top and bottom edges 150, the actual length of the top and bottom edges of the non-corrected reproduced visual image 118A would be slightly larger than six inches since the uncorrected reproduced visual image 118A is now located farther from the visual image generator 112. The data processor 115 is able to selectively determine the amount that the angular displacement of the laser beam should be reduced in tracing the top and bottom edges, such that despite the offset angle 144, the corrected reproduced visual image 118C is substantially correctly proportioned; i.e., 6 inches by 6 inches.

Although the illustrated embodiment is described as having the controller as a separate component from the visual image generator, it should be apparent to those skilled in the art that the controller may be an integral component of the visual image generator. Further, although the illustrated embodiment is described as having the data processor as a separate component from the image generator and controller, it should be apparent to those skilled in the art that the data processor may be an integral component of the image generator and/or controller.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A visual indexing system for assisting placement of an object upon a moving surface moving in a selected direction at a selected speed relative to a stationary reference, the visual indexing system comprising:

(a) a visual image generator operable to project a first visual image upon the moving surface such that the first visual image is reproduced upon the moving surface in a first location to form a first reproduced visual image and in a second location to form a second reproduced visual image;

(b) a controller operably connected to the visual image generator, the controller capable of controlling the location at which the visual image generator projects the first and second reproduced visual images upon the moving surface such that the first and second reproduced visual images move in substantially the selected direction and at substantially the selected speed of the moving surface, thereby resulting in substantially no relative movement between the first and second reproduced visual images and the moving surface; and (c) an optical sensor adapted to sense the object placed upon the moving surface and provide a sensed image of the object to a processor adapted to compare the sensed image relative to a model image of the object to determine any discrepancies between the sensed and model images, the processor coupled in signal communication with the controller and adapted to instruct the controller to adjust the location at which the visual image generator projects the second reproduced visual image upon the moving surface based upon a discrepancy found between the sensed and model images.

2. The visual indexing system of claim 1, wherein the visual image generator is a light source.

3. The visual indexing system of claim 2, wherein the light source is a laser.

4. The visual indexing system of claim 1, wherein the visual image generator is a liquid crystal display projection unit.

5. The visual indexing system of claim 1, wherein the moving surface is a conveyor belt.

6. The visual indexing system of claim 1, wherein the first visual image comprises text.

7. The visual indexing system of claim 1, wherein the first visual image is an outline of at least a portion of a periphery of the object.

8. The visual indexing system of claim 1, wherein the first reproduced visual image is at least a portion of an outline of a periphery of a nominal sized model of the object, and wherein any difference between the outline and the periphery of the object positioned at the outline indicates that the object varies from the nominal sized model of the object.

9. The visual indexing system of claim 1, wherein the processor is adapted to receive a signal indicative of the selected speed of the moving surface and adapted to instruct the controller to adjust the location of the first reproduced visual image upon the moving surface in accordance with the signal received such that the first reproduced visual image moves in substantially the selected direction and at substantially the selected speed of the moving surface.

10. The visual indexing system of claim 1, wherein the visual image generator is adapted to simultaneously project the first visual image upon the moving surface and a second visual image upon the moving surface.

11. The visual indexing system of claim 10, wherein the second visual image is stationary relative to the stationary reference.

12. The visual indexing system of claim 1, wherein the visual image generator is operable to simultaneously project a second visual image upon the moving surface to form a third reproduced visual image upon the moving surface that moves in substantially the selected direction and at substantially the selected speed of the moving surface resulting in substantially no relative movement between the third reproduced visual image and the moving surface.

13. The visual indexing system of claim 1, wherein the first reproduced visual image and the second reproduced visual image are spaced from one another upon the moving surface a selected distance.

14. The visual indexing system of claim 13, wherein the selected distance is adjustable.

15. The visual indexing system of claim 14, wherein the optical sensor is adapted to provide a sensed image of the object placed upon the moving surface to the processor, the processor adapted to compare the sensed image with a model image of the object and instruct the controller to control the spacing between the first and second reproduced visual images according to a discrepancy found between the sensed image of the object and the model image of the object.

16. The visual indexing system of claim 1, wherein the controller is adapted to selectively change a projected shape of the first visual image such that a shape of the first reproduced visual image remains substantially constant regardless of a change in an angle relative to the stationary reference of a trajectory axis about which the first visual image is projected.

17. The visual indexing system of claim 1, wherein the first reproduced visual image is comprised of light projected from the visual image generator reflected off of the moving surface.

18. The visual indexing system of claim 1, wherein the selected speed of the moving surface is adjustable, and wherein the controller is operable to selectively control the location of the first reproduced visual image so that the first reproduced visual image may accelerate or decelerate to match any acceleration or deceleration of the moving surface.

19. The visual indexing system of claim 1, wherein the visual image generator projects the first visual image about a first trajectory axis, wherein the controller is operably connected to the visual image generator for controlling an orientation of the first trajectory axis of the visual image generator relative to the stationary reference such that a location where the first trajectory axis intersects the moving surface moves in substantially the selected direction and at substantially the selected speed of the moving surface, resulting in substantially no relative movement between the first reproduced visual image and the moving surface.

20. The visual indexing system of claim 1, wherein the discrepancy is a difference in a location of the sensed object upon the moving surface relative to a desired location of the sensed object upon the moving surface.

21. The visual indexing system of claim 1, wherein the discrepancy is a difference in a size of the sensed object and a size of the model object.

22. The visual indexing system of claim 1, wherein the discrepancy is a difference in an orientation of the sensed object upon the moving surface relative to a desired orientation of the sensed object upon the moving surface.

23. An infeed system for a workpiece processor, comprising:

(a) a conveyor for delivery of workpieces to the processor, the conveyor including a conveyor belt supported by a frame and driven at a selected speed in a selected direction;

(b) a visual image generator operable to project a first visual image upon the conveyor belt such that the first visual image is reproduced upon the conveyor belt to form a first reproduced visual image and a second reproduced visual image;

(c) a control system for controlling a location at which the visual image generator projects the first visual image on the conveyor belt, whereby the first visual image moves at substantially the selected speed of the conveyor belt; and (d) an optical sensor adapted to sense the workpieces placed upon the conveyor belt and provide a sensed image of the workpieces to the control system, the control system adapted to compare the sensed image relative to a model image of the workpieces to determine any discrepancies between the sensed and the model images, the control system adapted to adjust the location at which the visual image generator projects the first visual image upon the conveyor belt to form the second reproduced visual image based upon a discrepancy found between the sensed and model images.

24. The infeed system of claim 23, wherein the visual image generator is comprised of a light source.

25. The infeed system of claim 24, wherein the light source is a laser.

26. The infeed system of claim 23, wherein the visual image generator is a liquid crystal display projection unit.

27. The infeed system of claim 23, wherein the first visual image comprises text.

28. The infeed system of claim 23, wherein the first visual image is an outline of at least a portion of a periphery of one of the workpieces.

29. The infeed system of claim 28, wherein the first visual image is at least a portion of an outline of a periphery of an ideal sized model of the workpieces, and wherein when one of the workpieces is placed within the outline, any difference between the outline and a periphery of the workpiece indicates that the workpiece varies from the ideal sized model of the workpieces.

30. The infeed system of claim 23, wherein the control system is adapted to accept and respond to a signal indicative of the selected speed of the conveyor belt.

31. The infeed system of claim 23, wherein the visual image generator is adapted to simultaneously project the first visual image and project a second visual image upon the conveyor belt.

32. The infeed system of claim 31, wherein the second visual image is stationary relative to a stationary reference point.

33. The infeed system of claim 23, wherein the visual image generator is adapted to simultaneously project a second visual image upon the conveyor belt in a location spaced from the first and second reproduced visual images to form a third reproduced visual image, and wherein the control system is operable to simultaneously control the location of the third reproduced visual image on the conveyor belt such that the first and second reproduced visual image move in substantially the selected direction and at substantially the selected speed of the conveyor belt, resulting in substantially no relative movement between the first and second reproduced visual images and the conveyor belt, and wherein the third reproduced visual image remains stationary relative to a stationary reference point.

34. The infeed system of claim 33, wherein a distance between the first and the second reproduced visual images is adjustable.

35. The infeed system of claim 23, wherein the selected speed of the conveyor belt is adjustable such that the conveyor belt may accelerate or decelerate.

36. The infeed system of claim 23, wherein the control system is adapted to selectively adjust a shape of the first reproduced visual image relative to an offset angle defined by an angle between an axis about which the first visual image is projected and a second axis perpendicular with the conveyor belt, such that the first reproduced visual image remains substantially constant in shape regardless of a change in the offset angle.

37. The infeed system of claim 23, wherein the first reproduced visual image is created by light projected from the visual image generator reflected off of the conveyor belt.

38. The infeed system of claim 23, wherein the selected speed of the conveyor belt is adjustable, and wherein the control system is operable to selectively control the location of the first reproduced visual image on the conveyor belt so that the first reproduced visual image may accelerate or decelerate to match any acceleration or deceleration of the conveyor belt.

39. A method of indexing placement of objects upon a surface moving relative to a stationary reference, the moving surface conveyed in a selected direction at a selected speed relative to the stationary reference, the method comprising:

(a) projecting visual images about corresponding trajectory axes from a visual image generator such that the visual images are reproduced upon the moving surface;

(b) controlling the movement of the trajectory axes of the visual image generator relative to the stationary reference such that the visual images reproduced upon the moving surface move in substantially the selected direction and at substantially the selected speed of the moving surface, resulting in substantially no perceived relative movement between the reproduced visual images and the moving surface; and (c) sensing the extent to which the objects are in registry with the visual images and then adjusting the selected speed of the moving surface depending upon the extent to which the objects are in registry with the visual images or adjusting a separation distance between adjacent visual images depending upon the extent to which the objects are in registry with the visual images.

40. The method of claim 39, wherein the visual image generator is comprised of a light source.

41. The method of claim 40, wherein the light source is a laser.

42. The method of claim 39, wherein the visual image generator is a liquid crystal display projection unit.

43. The method of claim 39, wherein the moving surface is a conveyor belt.

44. The method of claim 39, wherein at least one of the visual images comprises text.

45. The method of claim 39, wherein the visual images comprise outlines of at least portions of peripheries of the objects.

46. The method of claim 39, wherein the visual images comprise visual models of the objects, and wherein when the objects are placed in registry with the models, any difference between the models and the objects can be discerned.

47. The method of claim 39 further comprising simultaneously projecting a visual image upon the moving surface which is stationary relative to the stationary reference.

48. The method of claim 39, wherein each reproduced visual image is spaced from the other reproduced visual images.

49. The method of claim 48, wherein a distance between each reproduced visual image is adjustable.

50. The method of claim 39 further comprising:

(a) collecting data pertaining to the selected speed of the moving surface; and (b) using the data to control an orientation of the trajectory axes such that a location of the reproduced visual images upon the moving surface moves in substantially the same selected direction and at substantially the same selected speed as the moving surface.

51. The method of claim 39 further comprising placing the object upon the moving surface in a selected orientation relative to the reproduced visual images.

52. The method of claim 39, further comprising selectively controlling a location of the reproduced visual images so that the reproduced visual images may accelerate or decelerate to match any acceleration or deceleration of the moving surface.

53. A visual indexing system for assisting placement of an object in a selected location upon a moving surface moving in a selected direction at a selected speed relative to a stationary reference, the visual indexing system comprising:

(a) a visual image generator operable to project a first visual image upon the moving surface such that the first visual image is reproduced upon the moving surface;

(b) a controller operably connected to the visual image generator, the controller capable of controlling the selected location at which the visual image generator projects the first reproduced visual image upon the moving surface such that the first reproduced visual image moves in substantially the selected direction and at substantially the selected speed of the moving surface, thereby resulting in substantially no relative movement between the first reproduced visual image and the moving surface; and (c) wherein the first reproduced visual image is at least a portion of an outline of a periphery of a nominal sized model of the object, and wherein any difference between the outline and the periphery of the object positioned at the outline indicates that the object varies from the nominal sized model of the object.

54. A visual indexing system for assisting placement of an object in a selected location upon a moving surface moving in a selected direction at a selected speed relative to a stationary reference, the visual indexing system comprising:

(a) a visual image generator operable to project a first visual image upon the moving surface such that the first visual image is reproduced upon the moving surface;

(b) a controller operably connected to the visual image generator, the controller capable of controlling the selected location at which the visual image generator projects the first reproduced visual image upon the moving surface such that the first reproduced visual image moves in substantially the selected direction and at substantially the selected speed of the moving surface, thereby resulting in substantially no relative movement between the first reproduced visual image and the moving surface;

(c) wherein the visual image generator is operable to simultaneously project a second visual image upon the moving surface to form a second reproduced visual image upon the moving surface that moves in substantially the selected direction and at substantially the selected speed of the moving surface resulting in substantially no relative movement between the second reproduced visual image and the moving surface;

(d) wherein the first reproduced visual image and the second reproduced visual image are spaced from one another upon the moving surface a selected adjustable distance; and (e) an optical sensor adapted to provide a sensed image of the object placed upon the moving surface to a data processor, the data processor adapted to compare the sensed image with a model image of the object and instruct the controller to control a spacing between the first and second visual images according to a discrepancy found between the sensed image of the object and the model image of the object.

55. An infeed system for a workpiece processor, comprising:

(a) a conveyor for delivery of workpieces to the processor, the conveyor including a conveyor belt supported by a frame and driven at a selected speed in a selected direction;

(b) a visual image generator operable to project a first visual image upon the conveyor belt such that the first visual image is reproduced upon the conveyor belt, wherein the first visual image is an outline of at least a portion of a periphery of one of the workpieces;

(c) a control system for controlling a location at which the visual image generator projects the first visual image on the conveyor belt, whereby the first visual image moves at substantially the selected speed of the conveyor belt; and (d) wherein the first visual image is at least a portion of an outline of a periphery of an ideal sized model of the workpieces, and wherein when one of the workpieces is placed within the outline, any difference between the outline and a periphery of the workpiece indicates that the workpiece varies from the ideal sized model of the workpieces.

56. A visual indexing system for assisting placement of an object in a selected location upon a moving surface moving in a selected direction at a selected speed relative to a stationary reference, the visual indexing system comprising:

(a) a visual image generator operable to project a first visual image upon the moving surface such that the first visual image is reproduced upon the moving surface at a first location and to project a second visual image upon the moving surface such that the second visual image is reproduced upon the moving surface at a second location;

(b) a controller operably connected to the visual image generator, the controller capable of controlling the location at which the visual image generator projects the first and second visual images upon the moving surface such that the first and second reproduced visual images move in substantially the selected direction and at substantially the selected speed of the moving surface, thereby resulting in substantially no relative movement between the first and second reproduced visual images and the moving surface; and (c) a sensor in communication with the controller and adapted to sense an extent to which the object is in registry with the first reproduced visual image and based upon the extent to which the object is in registry with the first reproduced visual image, communicate with the controller to adjust a characteristic of the second visual image being projected upon the moving surface or a speed of the moving surface.

57. The visual indexing system of claim 56, wherein the characteristic is selected from a group consisting of a spacing of the second visual image from the first visual image and an angle at which the second visual image is projected upon the moving surface.

58. The visual indexing system of claim 56, wherein the characteristic is selected from a group consisting of a shape of the second visual image, the selected direction in which the second visual image moves, and an orientation of the second visual image.

59. The visual indexing system of claim 56, wherein the characteristic is selected from a group consisting of a text of the second visual image, an instruction of the second visual image, and an alarm condition indicated by the second visual image.

* * * * *